Dec. 26, 1933.  R. M. HESSERT  1,941,003
PHOTOGRAPHIC ACCESSORY
Filed Oct. 27, 1928  5 Sheets-Sheet 1

WITNESSES:
Gerhard Baule
Evelyn Crompton

INVENTOR:
Raymond M. Hessert,
BY
Joshua R H Potts
ATTORNEY

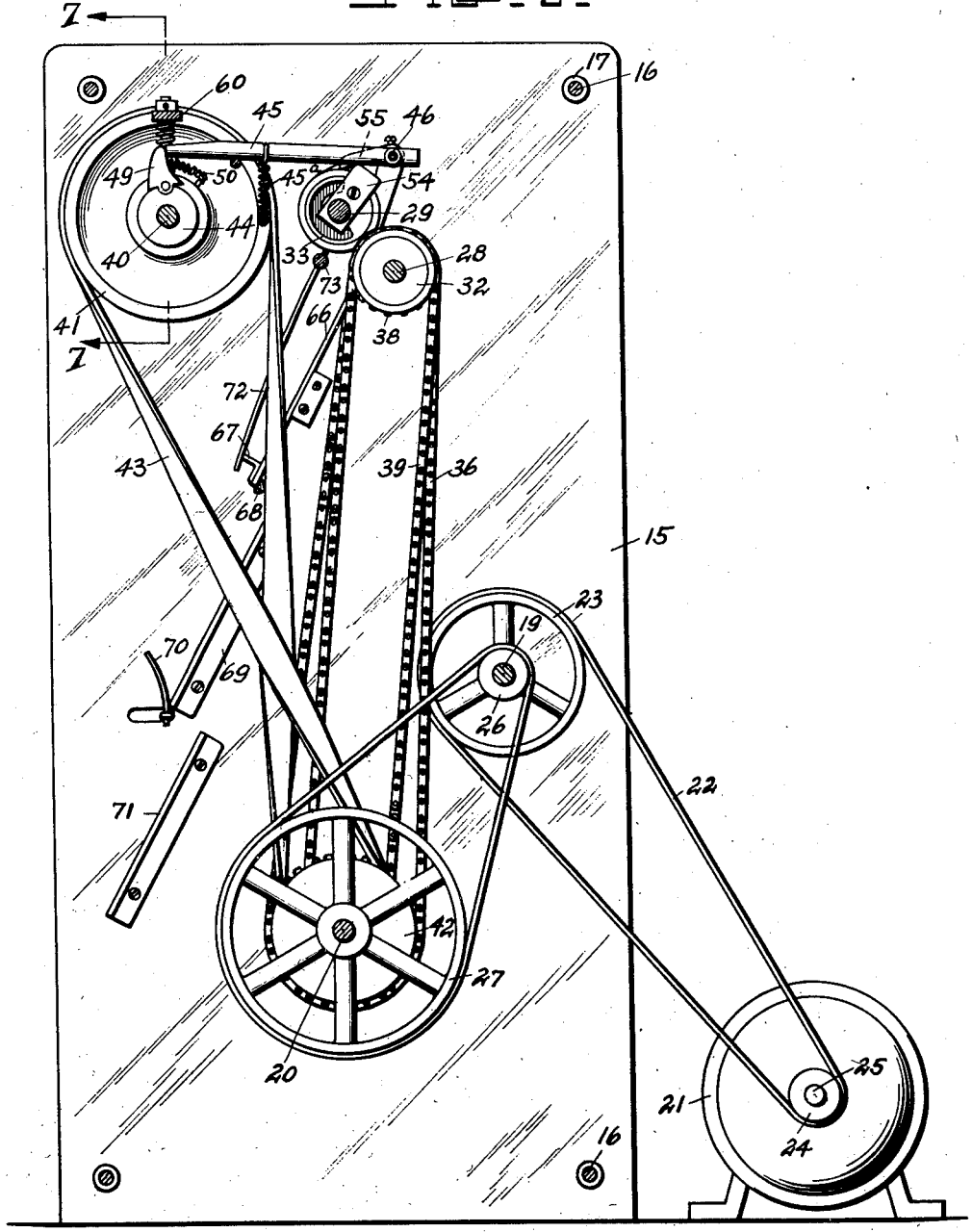

Dec. 26, 1933.   R. M. HESSERT   1,941,003
PHOTOGRAPHIC ACCESSORY
Filed Oct. 27, 1928   5 Sheets-Sheet 3
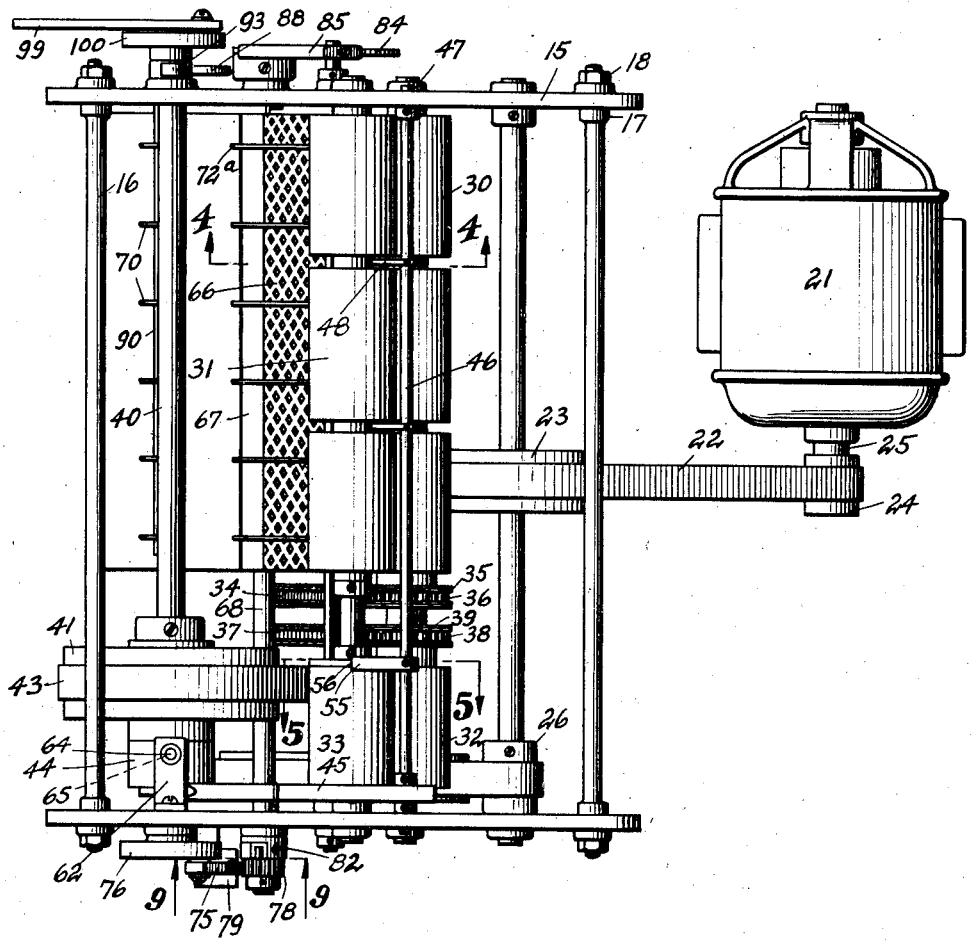
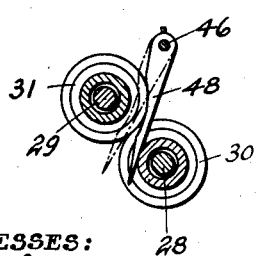
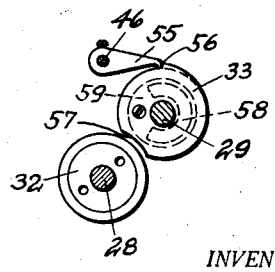
WITNESSES:
Gerhard Baule
Evelyn Crompton
INVENTOR:
Raymond M. Hessert,
BY
Joshua R. H. Potts
ATTORNEY.

Dec. 26, 1933.     R. M. HESSERT     1,941,003
PHOTOGRAPHIC ACCESSORY
Filed Oct. 27, 1928     5 Sheets-Sheet 4
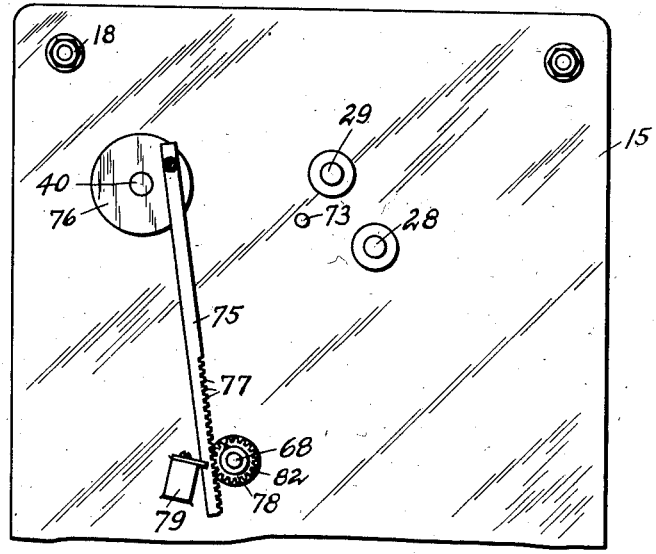
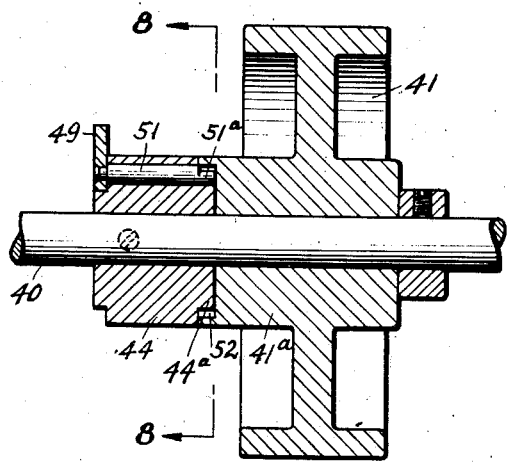
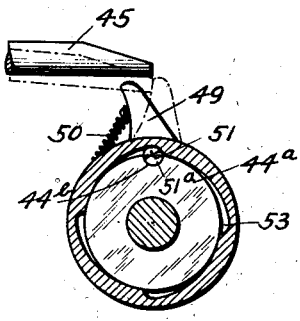
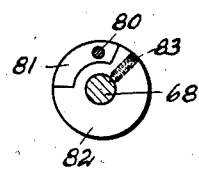
WITNESSES:
Gerhard Baule
Evelyn Crompton
INVENTOR:
Raymond M. Hessert,
BY
Joshua R. H. Potts
ATTORNEY.

Dec. 26, 1933.　　　R. M. HESSERT　　　1,941,003
PHOTOGRAPHIC ACCESSORY
Filed Oct. 27, 1928　　　5 Sheets-Sheet 5

WITNESSES:
Gerhard Baule
Evelyn Crompton

INVENTOR:
Raymond M. Hessert,
BY
　　　　ATTORNEY.

Patented Dec. 26, 1933

1,941,003

UNITED STATES PATENT OFFICE 1,941,003

PHOTOGRAPHIC ACCESSORY

Raymond Martin Hessert, Philadelphia, Pa.

Application October 27, 1928. Serial No. 315,387

26 Claims. (Cl. 88—24)

The present invention relates to devices for use in connection with photographic apparatus and has for its purpose the provision of mechanism for presenting an article, as a bank check or the like, in proper relation to a camera to be photographed thereby.

The invention has further for its objects, to provide a mechanism in which the article may be presented before the camera in various aspects as, in the case of a check, with both the face and the back of the check presented to the camera at various times. A further object is the provision of such a device which will be automatic in its operation and will eliminate all attention thereto on the part of the operator except the feeding of the checks to the machine.

In the device illustrated in accompaniment herewith, is presented a mechanism which provides stationary support, a reversible support thereabove and feeding means in the nature of rollers for delivering articles to the reversible support by which they are subsequently delivered to the stationary support. This device is characterized by the fact that the delivery operation of the reversible support is controlled by the passage of an article, as a check, between the delivery rollers certain mechanism being associated with these rollers movable by the passage of said article to exert this control.

It is well known that for the successful photographing of an object, a certain time must elapse between the opening and closing of the shutter of the camera and that the best results will be obtained when the article to be photographed remains stationary during this period. The present device is therefore equipped with certain delay mechanism peculiarly adapted for the needs of the present situation.

The details of the construction will be fully set forth in the specification hereinafter, and further objects and advantages of the device will appear incident thereto.

In the drawings,

Figure 1 is an elevation of the mechanism viewing the same from the camera side of the machine, Figure 2 is a section on the line 2—2 of Figure 1, showing the driving connections between various parts of the machine, Figure 3 is a top plan view of the machine, Figure 4 is a detail view on the line 4—4 of Figure 3, and Figure 5 is a detail view on the line 5—5 of Figure 3.

Figure 6 is a fragmentary side view of the device looking at the same from the right of Figure 1.

Figure 7 is an enlarged detail sectional view on line 7—7 of Figure 2.

Figure 8 is a detailed section on an enlarged scale on line 8—8 of Figure 7.

Figure 9 is a detailed section on an enlarged scale, compared with Figures 1 and 3, and on the line 9—9 of Figure 3.

Figure 1:
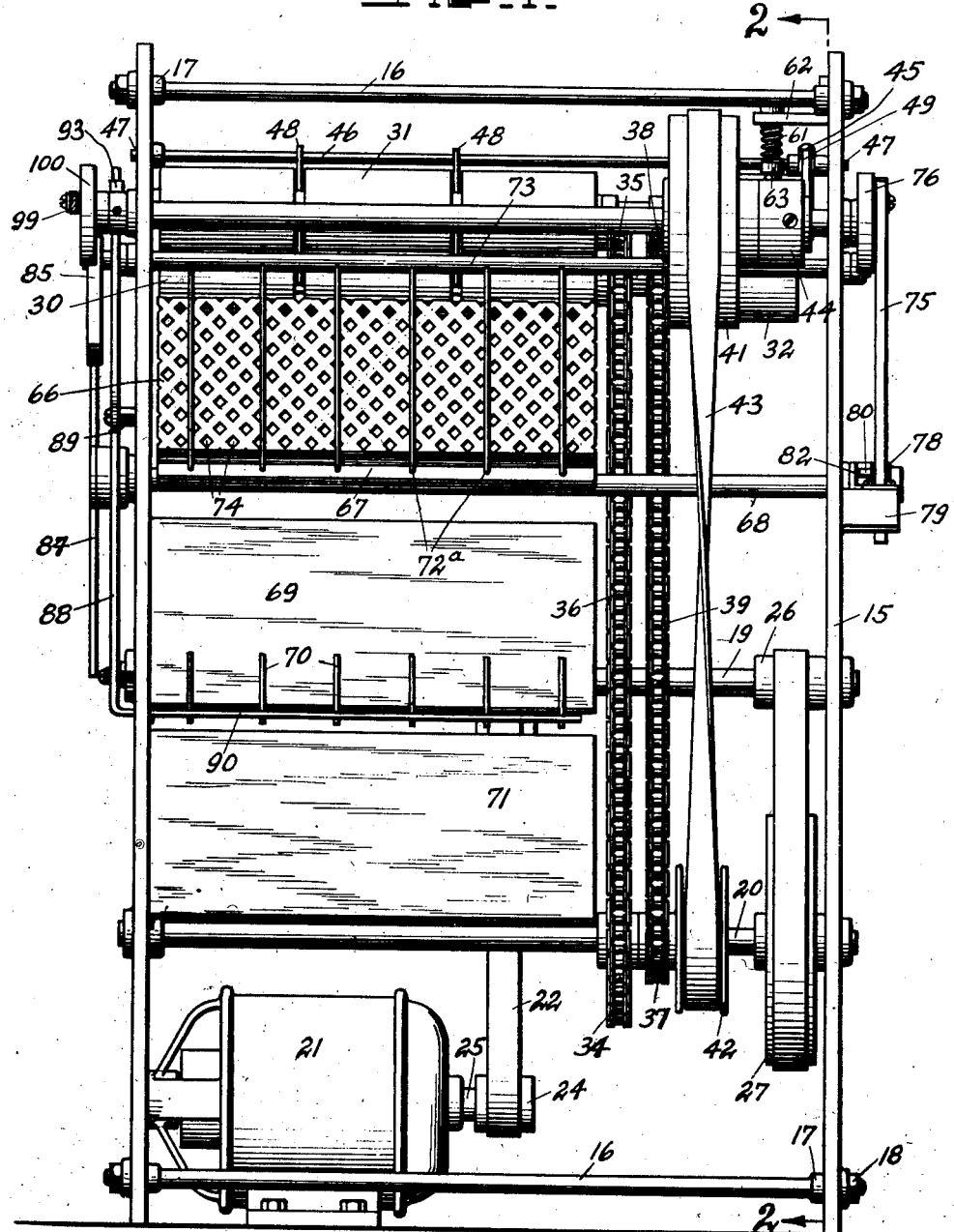
Figure 10:
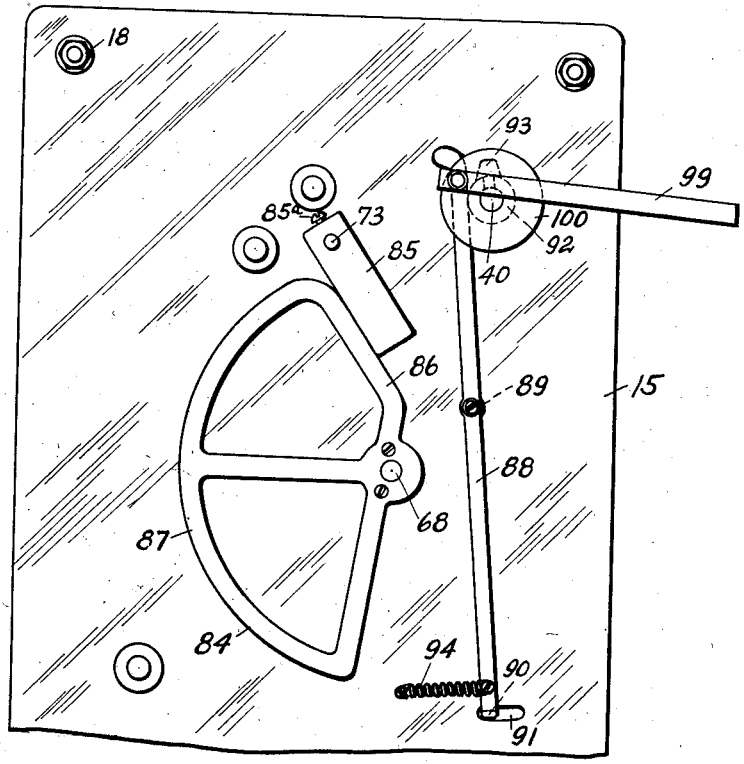
Figure 10 is a fragmentary side elevation of the machine viewed from the left as represented in Figure 1.

The present machine comprises a supporting structure in which is mounted a stationary platform for supporting an article, as a check, in position to be photographed by a camera stationed in opposition thereto.

Located in position to deliver a check to this platform, is a reversible support which is in the nature of a platform pivotally supported by its lower edge and having its upper edge normally resting in a position to receive an article fed thereto by means of feed rollers stationed thereabove. A guard is provided above the reversible support which itself is rockable on a shaft to permit the reversing action of the reversible support. The feed rollers have associated therewith mechanism which can control the reversing operation of the reversing mechanism in delayed timed relation to the passage of a check or other article between said rollers.

Holding means are provided associated with the stationary platform which prevent precipitation therefrom prematurely and these holding means are likewise synchronized to move away from the platform at a suitable interval after the check has been delivered thereto and in synchronized movement with the other parts of the device hereinbefore referred to.

The embodiment of the invention illustrated by the accompanying drawings constitutes a supporting structure consisting of side members 15 held together by tie rods 16 located at suitable points thereof as at the four corners of the side members. The side members are held in spaced relation to each other by means of collars 17 formed on the tie-rods and are held to the tie-rods by means of nuts 18 threaded to the ends of the rods. Journaled in the side members are a driving shaft 19 and a driven shaft 20, the former being driven by any suitable means as by a motor 21 connected therewith through a suitable means, as a belt 22, trained about pulleys 23 and 24, respectively, on shaft 19 and shaft 25 of the motor.

The shaft 20 is driven from the drive shaft 5 through pulleys 26 and 27, and by this arrangement, it will be apparent by reference to the drawings that the speed of the shaft 20 will have been reduced considerably relative to the speed of the motor shaft, since the pulley 27 is of greater diameter than the pulley 26 and the pulley 23 is of greater diameter than pulley 24.

A pair of shafts 28 and 29 are secured in the side members near the upper end thereof and said shafts have mounted respectively, thereon a plurality of rollers 30 and 31. The rollers 30 are connected so as to rotate together about the shaft 28 as an axis, and the rollers 31 are frictionally driven thereby. The rollers of each group are spaced apart as shown in Figure 3 of the drawings, the spaces between the rollers of the two groups being aligned for a purpose which will presently appear.

Shafts 28 and 29 each have a still further roller mounted thereon as indicated at 32 and 33 in Figure 3 of the drawings of a construction and for a purpose which will hereinafter appear.

The rollers 30 are driven from the shaft 20 with reduced speed relative thereto by means of sprockets 34 and 35 and sprocket chain 36 trained thereabout. The roller 32 is driven at the same speed as shaft 20 by sprockets 37 and 38 connected by the chain 39, sprockets 37 and 38 being equal in diameter.

A further shaft 40 is rotatably journaled in the side members 15 and has mounted thereon a pulley 41 which is rotatable on shaft 40 independently thereof. The pulley 41 is driven from shaft 20 through the instrumentality of a pulley 42 secured to the shaft 20 and a belt 43 trained about the pulleys 41 and 42. This shaft is instrumental in the operation of a reversible support and in the operation of other mechanism of the machine as will hereinafter appear.

As has been indicated above, the operation of the reversible support is synchronized with the operation of the feed rollers 30 and 31 so that the article delivered to the support by the rollers will remain stationary thereon for a predetermined period of time, the period being determined by the time necessary to take a proper photograph of the article. For this reason it is desirable to provide against the operation of a reversible platform other than in synchronized relation with the fed rollers and to arrange for the operation thereof incident to the passing of articles between the rollers. This is accomplished by the provision of a clutch 44 secured to shaft 40, this clutch being controlled through an arm 45 rotatable on shaft 46 which is journaled in the side members at 47. This shaft 46 has also secured thereto a plurality of fingers 48 which extend into the spaces between the pairs of rollers 30 and 31 as shown in Figures 3 and 4 of the drawings. The free end of the arm 45 acts as a stop to limit the movement of a lever 49 under the influence of the spring 50 secured at one end of the lever 49 and at its other end to the clutch 44.

The lever 49 is provided with a pin 51 connected thereto and extending into the clutch member 44. The clutch member 44 has a reduced portion at 44ª projecting into a recess 52 formed in the hub 41ª of the pulley 41. This recess is provided peripherally with cam-like grooves 53 and the end of the pin 51 is provided with a semicylindrical portion 51ª adapted to lie in a semicylindrical depression 44ᵇ formed in the cam member 44 when the end of the arm 45 is in abutting relation to the lever 49 as indicated in dotted lines in Figure 8.

When, however, the member 45 has been elevated to the full line position as shown in Figure 8, the lever 49 is rotated under the influence of the spring 50 and the end of the pin 51 assumes a position such as is shown in Figure 8, providing a driving connection between the pulley 41 and the shaft 40 through a clutch connection thereby.

The member 45 is operated against the influence of the spring 45ª connected thereto and to a suitable point on the adjacent side support and the operation of the member 45 takes place incident to the engagement therewith of a cam 54 which is secured to roller 33 and is adapted to rotate therewith. The roller 33 is normally prevented from rotation by a dog 55 secured to the shaft 46 and abutting against the shoulder 56 on the roller 33. This roller is, under these circumstances, out of frictional contact with the roller 32 which, as stated above, is constantly driven through sprocket chain 39. This condition is effected by forming a peripheral groove 57 longitudinally of roller 33 the surface of which is substantially concentric with the periphery of roller 32 when the dog 55 is in abutting relation with shoulder 56 as shown in Figure 5.

The roller 33 is preferably hollowed out as at 58 and eccentrically weighted as indicated at 59, so that when the dog 55 is released from the shoulder 56 the roller will rotate under the influence of gravity to bring the cylindrical surface thereof into frictional driven contact with the surface of the roller 32.

By reference to Figure 2, it will be seen that the arrangement of the cam 54 on the roller is such that the roller will have made almost a complete rotation on its axis before the cam contacts with the member 45 for lifting the same to free the lever arm 49. In other words, this latter action will be delayed substantially the time of one rotation of the roller 33 after an article has been passed between rollers 30 and 31. The shaft 40 is prevented from being prematurely carried along with pulley 41, by means of a brake or drag 60 yieldably held against the clutch member 44 by the spring 61 having one end abutting a supporting arm 62 extending from the side member 15 and the other end resting in a shoulder 63 formed on the drag. The drag is maintained properly centered relative to the clutch by a stem 64 extending upward through an aperture 65 through the arm 62.

When an article as a bank check is passed between rollers 30 and 31 as indicated above, it is delivered onto an inclined platform or support 66 and gravitates to the lower end thereof where it lodges on the ledge 67 (see Figures 1 and 2) and is held here until the above described rotation of cam 54 has been completed, and the clutch 44 has clutched with the hub 41ª of pulley 41 as described above. The platform 66 is secured at its lower end to a shaft 68 about which it turns reversing the check and delivering it onto a second inclined platform 69 which is preferably secured stationary to the side 15 of the machine. This second platform will receive the check reversed. That is, supposing the check is delivered onto the platform 66 face up, it will be delivered by the rotation of this platform to platform 69 with the back of the check exposed.

The check will be held on this platform by fingers 70 during an entire cycle of operation as described above, that is for the same length of time as the next succeeding check is held on platform 66. At the end of this period the check will be released by the movement of the fingers 70 away from the platform in a manner hereinafter to be described and will be permitted to slide down the incline 71 into a suitable receptacle placed therebeneath.

The checks are prevented from being projected beyond the platform 66 and are maintained thereon, when passed between the rollers 30, 31 by a guard 72 comprising a plurality of fingers 72a secured to a shaft 73 pivoted to the sides 15. The platform is preferably made of foraminous material, the apertures 74 therein causing the check to adhere to the platform when being reversed.

The reversing of the support or platform 66 is operated from shaft 40 through the instrumentality of a rack bar 75 eccentrically pivoted to a disc 76 secured on one end of shaft 40 which projects beyond one of the side supports 15. The teeth 77 of the rack bar are maintained articulate with a pinion 78 secured to the end of shaft 68 on which the reversible support or platform 66 is mounted by a guide member 79 on which the rack bar rides. It will appear therefore that for each rotation of the shaft 40, the bar 75 will make a down and up movement turning the platform 66 over upon platform 69, and depositing the check thereupon on the downward movement and recovering its original position on the up movement of the rack. When the rack begins its descent the shaft 68 will not immediately take up the movement due to a delayed motion mechanism between the pinion 78 and the shaft; the nature of which is clearly illustrated in Figures 1, 3 and 9.

This mechanism consists of a pin 80 extending from the pinion 78 and projecting into a peripheral slot 81 at one side of a disc 82, adjustably secured to the shaft 68 as by a set screw 83. This delayed motion permits the photographic exposure to be made before the reversing of the platform 66 begins.

The opposite side of the machine is provided with mechanism for suitably moving the guard 72 out of the path of the platform 66 in the reversing movement thereof and for holding it out of this path for a sufficient period to permit its unobstructed return to its initial position. This mechanism consists of a cam 84 secured to shaft 68 and an arm 85 secured to the shaft 73 by which the guard is supported, the arm rides on the periphery of the cam which is provided with a steep incline 86 extending substantially radially from the shaft 68 and a peripheral portion 87 substantially concentric with said shaft. As the shaft 68 rotates carrying platform 66 in its reversed position, arm 85 will ride up the incline 86 onto the circular portion 87 which is of sufficient radius to hold the guard 72 out of the path of the platform 66, while the platform turns to its lowermost position and will maintain it in this position until it has returned to its original position.

In the meantime, at a suitable time during the above described cycle retaining fingers 70 will have been moved from holding position at the bottom of platform 69 and the check thereon preceding to the one deposited by the above described movement will have been allowed to drop down onto the incline 71 and into a receptacle (not shown).

The movement of these retaining fingers 70 is accomplished through the instrumentality of an arm 88 pivotally mounted to the side of the machine by a bearing member 89. The arm has a portion 90 on one side of the pivot bent at right angles thereto and extending through an arcuate slot 91 in the side of the machine, and forming a support for the fingers 70, which are attached at intervals therealong.

The other end of the arm bears against a roller 92 secured on shaft 40 and on which is peripherally secured a lug 93. This lug will act on the arm 88 to hold the fingers 70 out of engagement with platform 69 long enough to allow the check thereon to be released and will permit the return thereof to holding position in ample time to catch the next check deposited by the reversible support 66.

As described above, the spring 94 connecting the lower end of the arm to the side frame 15 will insure the prompt return of the fingers to their normal position as soon as pressure on lever arm 88 by lug 93 is relieved.

Arm 85 is secured to shaft 73 by a set screw 85a and may be set to any position of angular adjustment relative thereto so that a suitable adjustment may be made between these parts to cause the raising and lowering of guard 72 so as to insure against its interference with the movements of platform 66.

Figure 11:
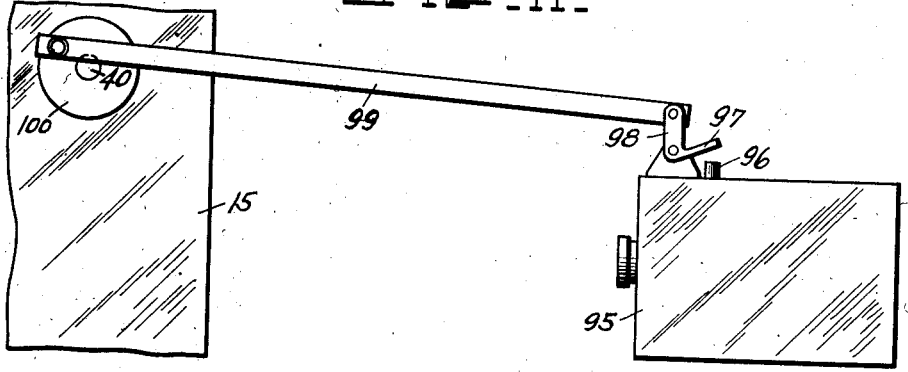
Figure 11 is a fragmentary detailed view showing a means for synchronizing the operation of the shutter of a camera with the mechanism of the present device in its broad aspects.

The device may be used in connection with any standard camera and suitable mechanism may be employed to synchronize the operation of the shutter thereof with the movements of the machine as described above. Such a synchronizing device is simply illustrated in Figure 11 of the drawings in which a camera 95 is shown provided with a push button control 96 for the shutter, this push button is operated at a suitable point in each cycle of the above described operation by means of a presser foot 97 constituting one arm of a bell crank lever 98 the other arm of which is connected through a bar 99, to an eccentric point on a disc 100, the disc being secured to any of the rotating parts of the machine as to shaft 40.

It is believed that the operation of the machine will be apparent from the above description, however, it may be wise to set forth briefly a recapitulation of the above description from an operative standpoint.

The shaft 20 is constantly driven from the motor 21 by speed reducing mechanism consisting of the pulleys 24, 23, 26 and 27, respectively, on shafts 24, 19 and 20. Rollers 30 and 32 are constantly driven from shaft 20 through the sprocket chains 36 and 39, respectively, and rollers 31 frictionally driven by the rollers 30. roller 33 being normally held out of contact with the roller 32 by the engagement of the dog 55 with the shoulder 56.

The machine is primarily designed for use in the photographing of checks in order that a record may be kept of the indicia both on the face and on the back thereof. The machine will, therefore, in the following operation thereof be described in connection with a use of this sort although it is to be understood that it may be applied to a variety of uses, too numerous to set forth.

When it is desired to use the machine for photographing checks, the checks are assembled and fed to the feed rollers 30 and 31 in a manner so that they will pass therebetween. As the checks pass between the rollers they are directed downwardly upon the platform 66 lodging on the ledge 67 on the lower end thereof.

The timing of the device is such that a check will remain in this position sufficient time for the check to be photographed, whereupon through mechanism hereinbefore described, the platform 66 is rotated with the shaft 68 and brought to a reversed position on top of the platform 69 depositing the check thereon which gravitates down the incline of the platform 69 to a position against the fingers 70.

The platform 66 is returned to its normal position and the second check is fed between the rollers 30 and 31 in the manner described above. Both of these checks are photographed together one with its front face exposed and the other with the back thereof toward the camera.

The turning of the platform 66 about the shaft 68 is accomplished through the reciprocation of the rack bar 75 with a delaying motion due to the arrangement of the pin 80 on the pinion 78 riding in a slot 81 on the wheel 82 which wheel is adjustably secured to the shaft 68 and on which the platform is mounted by means of the set screw 83 whereby the delayed movement due to this connection may be adjusted in order that an exposure may be completed before action takes place.

It will be understood that no operation of the platform 66 will take place until the obstructing member 45 has been removed from engagement with the lever arm 49 by the passing of a check between the rollers 30 and 31 upon the release of the lever 49 as indicated above. The clutch 44 attached to the shaft 40 will be thrown into a drive engagement with the pulley 41 whereupon the cycle of operations described will take place. The disengagement of the member 45 from the lever 49 is delayed by the operation of the cam 54 secured to the roller 33 which is normally held out of engagement with roller 32 by the dog 55. The passing of a check between the rollers 30 and 31 will raise the fingers 48 and rotate the shaft 46 on which the dog 55 is secured whereupon the roller 33, under the influence of the weight 59, will rotate forwardly into engagement with the roller 32 which is being constantly driven from the shaft 20 in the manner described above.

As the shaft 68 is being rotated to bring the platform 66 into a reverse position from that shown in Figure 2, and for the delivery of the check from the platform 66 to the platform 69. The cam 84 which is secured to the shaft 68 will be rotated in a forward direction raising the arm 85 and rotating the shaft 73 whereby the guard 72 is raised to a position to permit the free rotation of the platform 66 and, as stated above, the surfaces 87 of the cam 84 holds the guard in raised position during the complete reciprocation of the platform 66, the release of the checks from the platform 69 is accomplished through the removal of the fingers 70 from the lower edge thereof and this is brought about through the instrumentality of the arm 88 which is moved by the lug 93 against the influence of the spring 94, the lug 93 being connected for rotation with the shaft 40 the position of the lug 93 is such that the check will be released at a suitable time during the cycle of operations and such that the fingers 70 will be in place against the lower edge of the platform 69 when the subsequent check is delivered thereupon.

It will be apparent from the above description that I have evolved a device which is automatic in all of its operations except for the feeding of the checks to the feed rollers and in which the photographing thereof will be accomplished with the utmost expedition and accuracy and in which the positive turning of the check between exposures will be accomplished without fail.

In the carrying out of these ideas I have devised specially adapted mechanism for the perfection of the operation of the machine and I wish to emphasize in this particular case the arrangement of the cam 54 in relation to the weighted roller 33 for delaying the movement of member 45 in its release of the lever 49, also the specific clutch mechanism for connecting the shaft 40 with the pulley 41 and of the cam construction for raising the guard 72 and maintaining it in raised position while the platform 66 is being reciprocated.

It is believed also that the arrangements of the lug 93 in connection with the arm 88 for operating the fingers 70 to release the check from the lower platform is also a unique and special development in my device.

While I have illustrated and described one embodiment of my invention, it will be understood that modifications may be made without departing from the spirit thereof and, hence, I do not wish to limit myself to the precise construction set forth but consider that I am at liberty to make such changes and alterations as fairly come within the scope of the appended claims.

I claim:—

1. In a device of the character described, means for presenting an article so that it may be photographed on both of two reverse sides, means for feeding articles to the first named means and means automatically operated for reversing said article between exposures operated by the passage of articles through the feeding means.

2. In a device of the character described, means for presenting an article for photographing the same on reverse sides, comprising reversing means for the article, feeding means associated therewith, and means for operating the reversing means with a delayed movement relative to the operation of the feeding means and automatically controlled by the feeding of articles by the feeding means.

3. In a device of the character described, means for presenting an article so that it may be photographed on reverse sides, including reversing means for the article, feeding means associated therewith, and means for operating the reversing means with a delayed movement relative to the operation of the feeding means, means associated with the feeding means operable by the feeding of articles thereto and controlling the operation of the reversing means.

4. In a device to be used in connection with photographing means for reversing an article to be photographed in more than one aspect, feed means associated with the reversing means, and means automatically operated by the delivery of an article into the feed means for causing the reversing means to operate.

5. In a device for use in connection with photographing means having means therein for supporting an article to be photographed, means for feeding the article to the supporting means, and means for reversing the position of the supporting means, operable by the delivery of an article to the feeding means.

6. In a device for use in connection with photographing an article successively in different aspects, a plurality of means adapted successively to handle the article and to deliver the same one to another in succession, one of said means being adapted to reverse the article under control of the delivery of a second article to a means precedent thereto.

7. In a device for use in connection with the photographing of articles in various aspects, means for supporting the article and for reversing the same, and means for feeding the articles to said first named means, said feeding means having mechanism associated therewith, operable by the delivery of an article to the feeding means to control the reversing of said reversing means automatically with a delayed action.

8. In a device of the character described, feeding means, supporting and reversing means for receiving and reversing articles delivered thereto by the feeding means, means controlling the reversing action of the second named means with a delayed action relative to the delivery of an article from the feeding means thereto, said controlling means including an eccentrically weighted friction driven member.

9. A device of the character described, consisting of parallel shafts having spaced feed rollers thereon frictionally related, a reversing device positioned to receive articles from the feed rollers and reverse the same, driving means and a clutch control between the driving means and said reversing means, and means controlling the operation of said clutch including fingers extending into the spaces between said rollers and operable incident to the passage of an article between said rollers.

10. A device of the character described having a feed mechanism, a support reversibly mounted and adapted to receive articles from the feed mechanism, drive means for said feed mechanism and for reversing said support, a clutch controlling the reversal of the support and cam means operable to permit the clutch to become effective, said cam means being operable to cause a delayed action of said clutch relative to the feed mechanism.

11. A device of the character described having a feed mechanism, a support reversibly mounted and adapted to receive articles from the feed mechanism, drive means for said feed mechanism and for reversing said support, a clutch controlling the reversal of the support and cam means operable to permit the clutch to become effective, said cam means being operable to cause a delayed action of said clutch relative to the feed mechanism, and means for operating the cam normally inoperative and means for causing the cam to become operative by the feeding of articles to the feed mechanism.

12. A device of the character described, including spaced pairs of contacting feed rollers, a reversible support for receiving articles from said rollers, driving means for said rollers and driving means for operating said support, a clutch controlling the operation of the reversible support, and means controlling the operation of the clutch consisting of a finger resting in the space between the rollers and movable by the passage of articles between the rollers, a cam normally inoperative and gravity controlled means for rendering the cam operative, and means holding the clutch normally inoperative, said clutch holding means being released from the holding means by the operation of said cam, said cam being held inoperative through instrumentalities connected with said finger, the movement of said finger as above rendering said instrumentalities inoperative, a guard spaced from said reversible support, and means for lifting said guard incident to the movement of the support.

13. A device of the character described, having a reversible support for articles to be photographed in various aspects, a guard for said support, raisable from guarding position when the support is being reversed, and means for raising and maintaining said guard raised during the movement of the support from and back to its normal position.

14. A device of the character described, having a reversible support for articles to be photographed in various aspects, a guard for said support raisable from guarding position when the support is being reversed, means for raising and maintaining said guard raised during the movement of the support from and back to its normal position, a platform beneath the support and adapted to receive an article from the reversible support, and means associated with the platform for holding the article thereagainst, said means being movable to release said article and means for moving said holding means from holding position, said movement being controlled in timed relation to the movement of said reversible support.

15. A device of the character described, having a reversible support for articles to be photographed in various aspects, a guard for said support raisable from guarding position when the support is being reversed, means for raising and maintaining said guard raised during the movement of the support from and back to its normal position, a platform beneath the support adapted to receive an article from the reversible support, and means associated with the platform for holding the article thereupon, said means being movable to release said article and means for moving said holding means from holding position, said movement being controlled in timed relation to the movement of said reversible support and so as to be always in holding position when an article is delivered to said platform by said reversible support.

16. A device of the character described, including reversible means for supporting an article to be photographed, and means for delivering articles to said reversible means, driving means for said reversible means, and a driving connection between the driving means and reversible means including delayed motion mechanism, said delayed motion mechanism including a rack-driven pinion having a pin extending therefrom, and a shaft connected with the reversible means and having a collar connected therewith recessed to receive said pin, said collar being adjustable on the shaft.

17. A machine for presenting articles to be photographed in a plurality of aspects in proper position to a camera consisting of an inclined platform, a reversible support above the platform, and feed mechanism for delivering articles to said support, means controlling the operation of the reversible support, controlled by the passing of an article through the feed mechanism, said reversing mechanism operating to deliver an article to said platform, and means for holding the article on the platform, means for releasing the holding means synchronously with the operation of the reversible support.

18. Apparatus for passing articles along a course and reversing the same in passing, including an upper support, a guard spaced therefrom, a lower support, said upper support being operably mounted to deliver articles in reversed position to the lower support, and means to deliver articles between said guard and upper support.

19. In a machine of the character described, feeding means continuously driven, supporting and reversing means, clutch means continuously driven adapted to connect with the supporting and reversing means, and means controlled by the feeding of articles to the feeding means for effecting the connection of the clutch means with the reversing means.

20. In a machine of the character described, inclined platforms positioned so as to deliver one to the other, one of said platform being rotatable to position overlying the next lower platform, means for feeding articles to the rotatable platform, and means operable by the feeding of articles controlling the rotation of the rotatable platform.

21. A document photographing machine comprising a check handling device and a camera, separate mechanical means on the handling device for positioning, maintaining and discharging a document, and means for actuating said camera and said several mechanical means by the feeding of documents to the handling device.

22. A document handling device, a document reversing member, rolls for feeding a document to said member, said rolls incorporating means actuated by the fed document to operate said reversing member.

23. In a document handling device, a document reversing member, rolls for feeding a document to said member, and means holding said document momentarily controlled by said rolls for stationary and then operating said member to reverse the document.

24. A document handling device comprising document feeding means, a support on which the feed means drops a document by gravity, means for placing said document on a second support in reversed position, and means for disengaging said document from the second support to permit the same to fall by gravity from the device.

25. A document photographing machine comprising feed rolls for passing a document into position for photographing, and said rolls incorporating means for actuating mechanism for reversing the document to photograph the reverse side of same.

26. A document photographing machine comprising feed rolls for passing a document into position for photographing, said rolls incorporating means for actuating mechanism for reversing the document to photograph the reverse side of same and for discharging the document from the machine.

RAYMOND MARTIN HESSERT.